United States Patent
Newell (10) Patent No.: US 9,908,549 B2
(45) Date of Patent: Mar. 6, 2018

(54) DUAL MOTOR DRIVE SYSTEM FOR A MATERIAL HANDLING DEVICE

(71) Applicant: Powerhandling Inc., Spokane, WA (US)

(72) Inventor: Gregory James Newell, Cascais (PT)

( * ) Notice: Subject to any disclaimer, the term of this patent is extended or adjusted under 35 U.S.C. 154(b) by 267 days.

(21) Appl. No.: 14/829,620

(22) Filed: Aug. 18, 2015

(65) Prior Publication Data
US 2017/0050832 A1  Feb. 23, 2017

(51) Int. Cl.
*B62B 3/06* (2006.01)

(52) U.S. Cl.
CPC ................... *B62B 3/0612* (2013.01)

(58) Field of Classification Search
CPC .................................................. B62B 3/0612
USPC ........................................................ 180/6.48
See application file for complete search history.

(56) References Cited

U.S. PATENT DOCUMENTS

| 2,359,493 | A | * | 10/1944 | Schreck | ............... B62B 3/0612 180/13 |
| 3,762,761 | A | * | 10/1973 | Erickson | ............ B66F 9/07545 280/756 |
| 3,827,517 | A | * | 8/1974 | Williamson | ............ B62D 7/04 180/21 |
| 7,789,175 | B2 | | 9/2010 | Toby et al. | |
| 8,752,657 | B2 | | 6/2014 | Newell | |

OTHER PUBLICATIONS

Product Datasheet, Logimover, Downloaded Aug. 18, 2015 from www.logimover.info, Eisenmann Anlagenbau GmbH & Co., Germany.

* cited by examiner

*Primary Examiner* — Anne Marie M Boehler
*Assistant Examiner* — Felicia L. Brittman (57) ABSTRACT

A novel apparatus and methods for automating or robotically controlling a motorized pallet jack are described herein. A fixed threaded shaft connected to the main pallet structure has a threaded engagement with a rotating shaft. The rotating shaft has two motorized drive wheels that each can be independently controlled causing potential rotation of the rotating shaft with respect to the fixed threaded shaft. Independent control of each drive wheel provides the ability to translate the jack, turn the jack, as well as raise and lower the pallet jack.

12 Claims, 10 Drawing Sheets

DUAL MOTOR DRIVE SYSTEM FOR A MATERIAL HANDLING DEVICE

CROSS REFERENCE TO RELATED APPLICATION

There are no related applications.

STATEMENT REGARDING FEDERALLY SPONSORED R&D

Not related to this application.

TECHNICAL FIELD

This invention relates to material handling devices. More particularly, the present invention is directed at motorized, remoted controlled, and automated pallet jacks.

BACKGROUND OF THE INVENTION

Pallet Jacks, both manual and motorized, are used to move objects and loads that are often stacked on pallets. Pallet jacks are typically comprised of a fork shaped lifting structure, two front lifting wheels, a rear wheel, a rotatable operating handle and a hydraulic assembly connecting the handle to the fork structure. The pallet jack assembly provides the ability to lift a load from the ground, the safe transport of the load to a desired location, and to return the load to the ground. Some pallet jacks have rear left and right casters for improved stability.

With manually operated pallet jacks, the user applies a force to the rotatable rear handle causing movement of the overall pallet jack and load. After a user places the pallet jack under a desired load, the user raises and lowers the handle which is connected to a hydraulic cylinder. The hydraulic cylinder moves mechanical linkages causing vertical displacement of the forks, and load, relative to the ground. The rotatable handle is then used to steer and move the load to the desired location. Most manual pallet jacks have a lift actuation lever mounted to the handle which releases the pressure in the hydraulic cylinder causing the load to safely return to the ground. Manual pallet jacks are well known in the art of material handling. They have widespread adoption and a low cost point.

Motorized pallet jacks are used for making it easier and potentially safer for the operator to move a load than with manual pallet jacks. Rather than relying on the force generated by the user to move the load, motorized pallet jacks have an electrical motor attached to the rear wheel making it a drive wheel. The torque from the electric motor provides forward and reverse translation of the pallet assembly. Attached to the rotatable handle is a second actuator that controls the direction and speed of the electric motor and pallet assembly. The operator steers the pallet the same as a manual version, via the rotatable rear handle. Lifting the load is most often done via a manual type hydraulic cylinder, or can be accomplished by connecting a pump or lift motor to the batteries of the electric drive motor. With the addition of batteries and controls, the drawback of existing motorized pallet jacks is that they are usual larger than manual versions and can cost substantially more to produce.

Remote controlled pallet jacks are used to move a load without physical interaction of a user. The user instructs the pallet jack via a handled controller, such as a mobile phone or pendant. The rear wheels of the jack are motorized for linear travel and steering is accomplished with an additional motor that spins the drive wheel assembly in the desired direction of travel. To raise the jack forks, yet another motor is used to actuate a hydraulic cylinder. Remote controlled pallet jacks are beneficial to user safety, but the additional motors of the prior art make them substantially large, expensive and complex.

Recently, fully automated pallet jacks have been developed. These systems use a computer system for guiding and controlling the overall assembly, thus eliminating the need for an operator. Automated material movers are most commonly referred to as Automated Guided Vehicles ("AVG") as they look and perform more like a vehicle than a pallet jack. Their designs have been driven by large warehouse and "pick and ship" companies and thus are highly specialized. Although suitable for use in specialized facilities, they are too expensive and specialized to be used as replacement for manual and motorized pallet jacks in most applications.

In these respects, the present invention departs from conventional concepts of the prior art by providing a motorized, remote controlled, or automated pallet jack that can be used in existing manual pallet jack applications. The independently driven dual drive wheels, according to the present invention, provide the ability to move, steer and lift a load through the use of two motors. The present invention provides a more compact and low cost motorized pallet jack than the prior art.

SUMMARY OF THE INVENTION

The present invention therefore is directed at providing a motorized, remote controlled, and potentially automated material transport device. Through the use of independently driven dual drive wheels, the present invention provides a compact and low cost motorized pallet jack that can adapted for use in a large number of existing manual pallet jack applications. The present invention has a main jack structure having forward protruding forks for insertion under or into a pallet. The main jack structure is connected or includes a stationary threaded shaft which is engaged with a rotatable shaft having a corresponding set of threads. The rotatable shaft is connected to two opposing wheels each having independently controlled motors. When the two opposing wheels rotate in the same direction at the same speed the pallet jack moves forward or backward. When the wheels move in the same direction and at different speeds, the pallet jack turns. When the wheels move in opposite directions at the same speed, the rotating shaft turns around the stationary shaft causing the pallet jack to raise or lower without horizontal movement. A rotating electrical connector assembly allows for multiple rotations of the rotating shaft with respect to the main structure. The independently driven wheels according to the present invention, provide linear translation and turning of the pallet jack, as well as lifting of the load.

One embodiment of the present invention is a fully automated system where a remote computer system provides movement instructions to the pallet jack via a wireless communication protocol. The computer system can utilize data from a database to coordinate multiple pallet jacks within a facility. Based upon the desired pallet movement, the controller of the pallet jack can instruct each wheel to provide the needed movement of the jack to accomplish the task.

Another embodiment of the present invention is a remote controlled version wherein a user instructs the pallet jack through the use of a local pendant or mobile device.

In another embodiment of the present invention, the pallet jack can be purely motorized with steering coming from the user via a steering and lifting tiller.

These and other features, aspects, and advantages of the present invention will become better understood with regard to the following description, appended claims, and accompanying drawings.

BRIEF DESCRIPTION OF THE DRAWINGS

Preferred embodiments of the invention are described below with the reference to the following accompanying drawings.

DETAILED DESCRIPTION OF THE PREFERRED EMBODIMENTS

Many of the fastening, connection, wiring, control, manufacturing and other means and components utilized in this invention are widely known and used in the field of the invention, and their exact nature or type is not necessary for a person of ordinary skill in the art or science to understand the invention; therefore they will not be discussed in detail. Furthermore, the various components shown or described herein for any specific application of this invention can be varied or altered and anticipated by this invention and the practice of a specific application or embodiment of any element may already be widely known or used in the art, or persons skilled in the art or science; therefore, each will not be discussed in significant detail.

Figure 1:
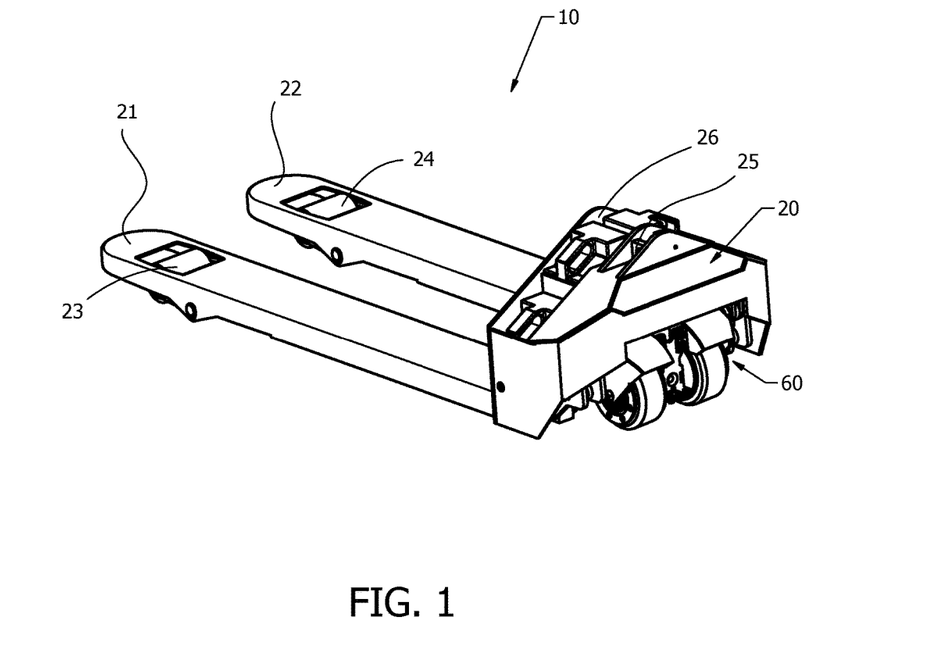
FIG. 1 is a front perspective view of a dual drive wheel pallet jack according to the present invention.
Figure 2:
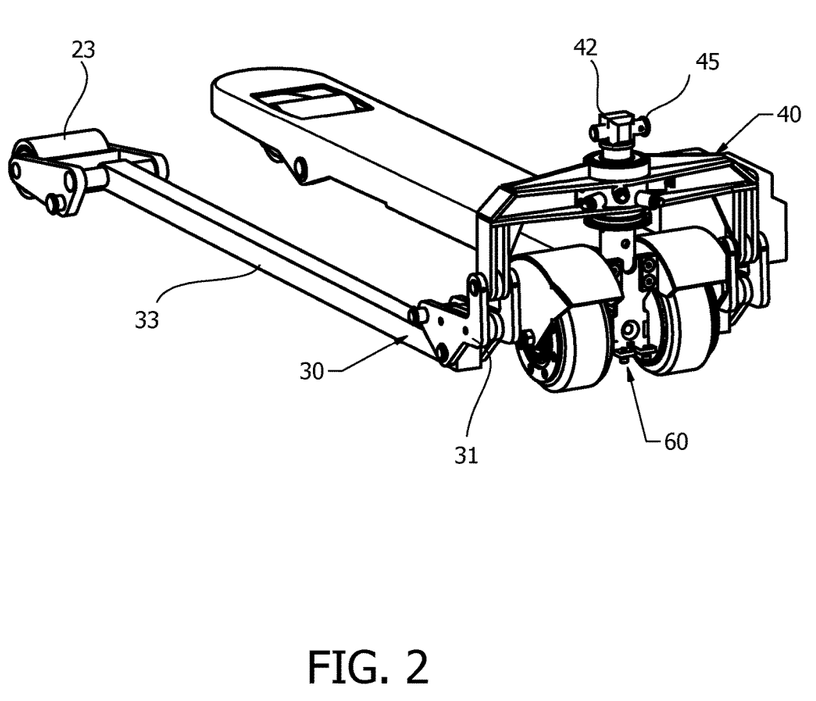
FIG. 2 is a front perspective view of the dual drive wheel pallet jack of FIG. 1, with the left fork and structure assembly not shown.

Now referring to drawings. FIG. 1 shows a preferred embodiment of the present invention. A pallet jack assembly 10 is shown having a structure assembly 20, a drive assembly 60, a left fork 21, and a right fork 22. Left fork 21 has a left load wheel 23 and right fork 22 has a right load wheel 24, both mounted via an axle to the forward part of their respective fork. As shown in FIG. 2, a link assembly 30 connects left load wheel 23 to drive assembly 60 and also to structure assembly 20 (hidden in FIG. 2). Right fork 22 also has a link assembly 30 captured within. In combination, structure assembly 20, drive assembly 60, link assembly 30, left fork 21, right fork 22, left load wheel 23 and right load wheel 24 provide the means to mechanically lift and move a pallet. These elements generically describe common form factor pallet jacks.

Pallet jacks are common in the art of material handling and well understood by those skilled in the art and thus do not need to be described in significant detail for one to practice the present invention. Generally, there are many different configurations, sizes and styles of pallets. Forks are inserted into cavities of a pallet putting the forks under the load. The jack lifts the load by the jack structure moving upward from the rear wheels while the front wheels extend from the fork. The result is the forks move upward, picking up the pallet and load from the ground.

It should be appreciated that there are numerous styles of common pallet jack versions that are optimized for different pallet, loads and grounds. Although the pallet jack structures shown in FIG. 1 and described above show a best mode of the present invention, it should be appreciated that the present invention can be adapted to many common pallet jack form factors without departing from the spirit and scope of the present invention. For example, although structure assembly 20 is shown having two forks common in the art of pallet jacks, the present invention could have one or many forks suitable for a given material moving application. The preferred pallet jack embodiment shown has link assembly 30 having numerous pin connections connecting load wheels 23 and 24 to structure assembly 20 and drive assembly 60. A vertical translation of a pivot assembly 40 relative to the ground causes link plate 31 to rotate causing link arm 33 to move left and right. Motion of link arm 33 causes load wheels 23 and 24 to move vertically away from left and right forks 21 and 22 and towards the ground, thus creating lift. The link assembly described provides the means of lifting a pallet through the use of a single vertical actuator. A single actuator with linkages is desirable as it is lower cost, more compact and easier to coordinate lift in comparison to multi actuated lift jacks. It should be appreciated that alternative lift linkages can be applied to the present invention. The present invention should not be construed to be limited to any particular version of common pallet jack.

Structure assembly 20, and according to the best mode of the present invention, is shown as a welded assembly but may also be made from or include fastened panels. Above drive assembly 60 is a pin mount hole 25 for interfacing with a fixed threaded head 42 via a main pin 45. Structure assembly 20 includes a battery compartment 26 for removably housing one or more battery modules 93. Battery compartment 26 is preferably located behind forks 21 and 22 and forward of main pin 45. Battery compartment 26 may be open (as shown) for quick battery replacement or a cover can be added for additional battery protection. Welded to battery compartment 26 are left fork 21 and right fork 22.

FIG. 2 shows drive assembly 60 with most of structure assembly 20 hidden (right fork 22 shown). Drive assembly 60 can also be seen in more detail in FIGS. 4 and 5. A fixed threaded shaft 41 has fixed threaded head 42 and a fixed thread 43. Fixed threaded head 42 has a hole corresponding with main pin 45. Although a pin connection is shown as a best mode for securing fixed threaded shaft 41 to structure 20, it should be appreciated that any type of common mechanical connection method, such as welding or bolting, can be utilized within the spirit and scope of the present invention. Fixed thread 43 of fixed shaft 41 engages a rotating shaft 50 via a rotating shaft thread 51. Fixed shaft 41 is not allowed to turn due to main pin 45 fixing it to structure assembly 20. It should be appreciated that rotating shaft 50 can rotate shaft threads 51 in relationship to fixed shaft threads 43 causing vertical translation of fixed shaft 41 relative to rotating shaft 50. According to the best mode of the present invention, threads 51 and 43 are approximately one inch in diameter and have 5 threads per inch. It should be appreciated that the present invention can have any thread or diameter suitable for a particular application and should not be construed to be limited to any particular size. Rotating shaft 50 has a load shoulder 53 which in combination with a load bearing 54 translates vertical forces from rotating shaft 50 into pivot assembly 40. A radial bearing 55 in combination with collar 46 securely connects pivot assembly 40 to rotating shaft 50 so that rotating shaft 50 can only turn. It should be appreciated that rotation of rotating shaft 50 causes it to move vertically with respect to structure assembly 20 but not vertically with respect to pivot assembly 40. With rotation of rotating shaft 50, pivot assembly 40 causes link assembly 30 to raise or lower forks 21 and 22 by moving wheels 23 and 24 vertically. Rotating shaft 50 provides the means to raise or lower structure 20 in a mechanically coordinated way.

Figure 3:
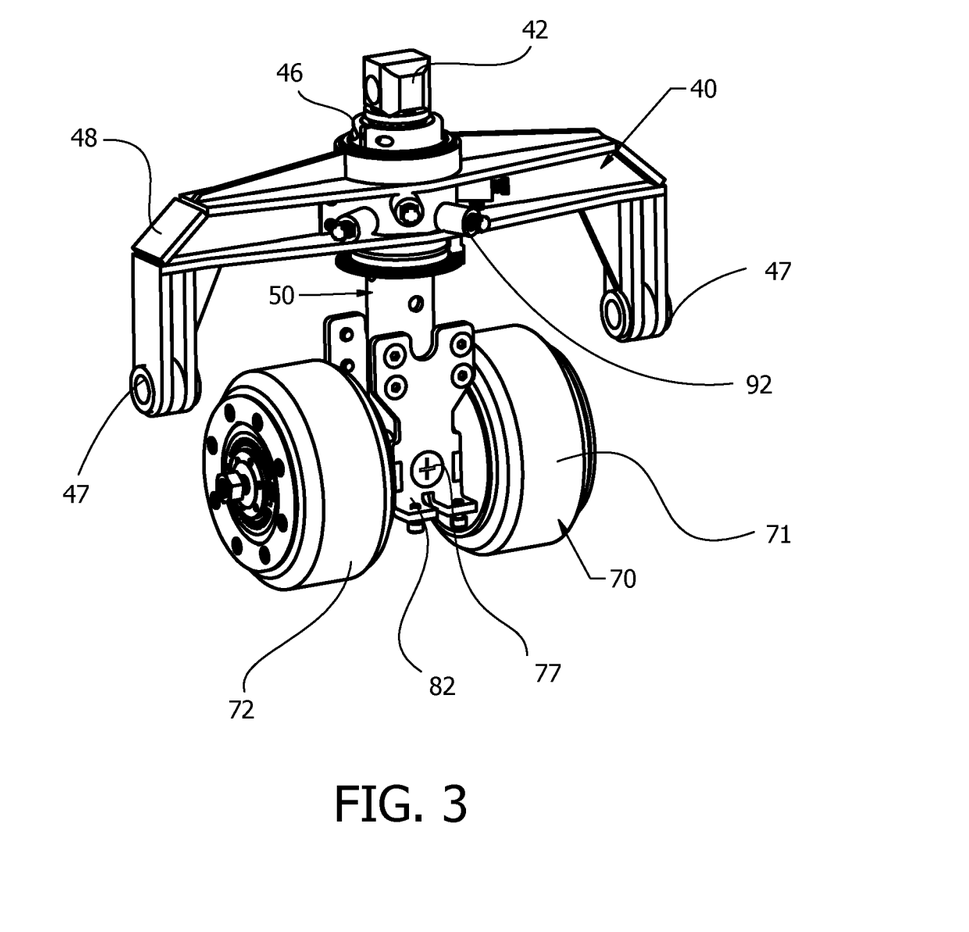
FIG. 3 is a perspective view of a drive assembly.
Figure 4:
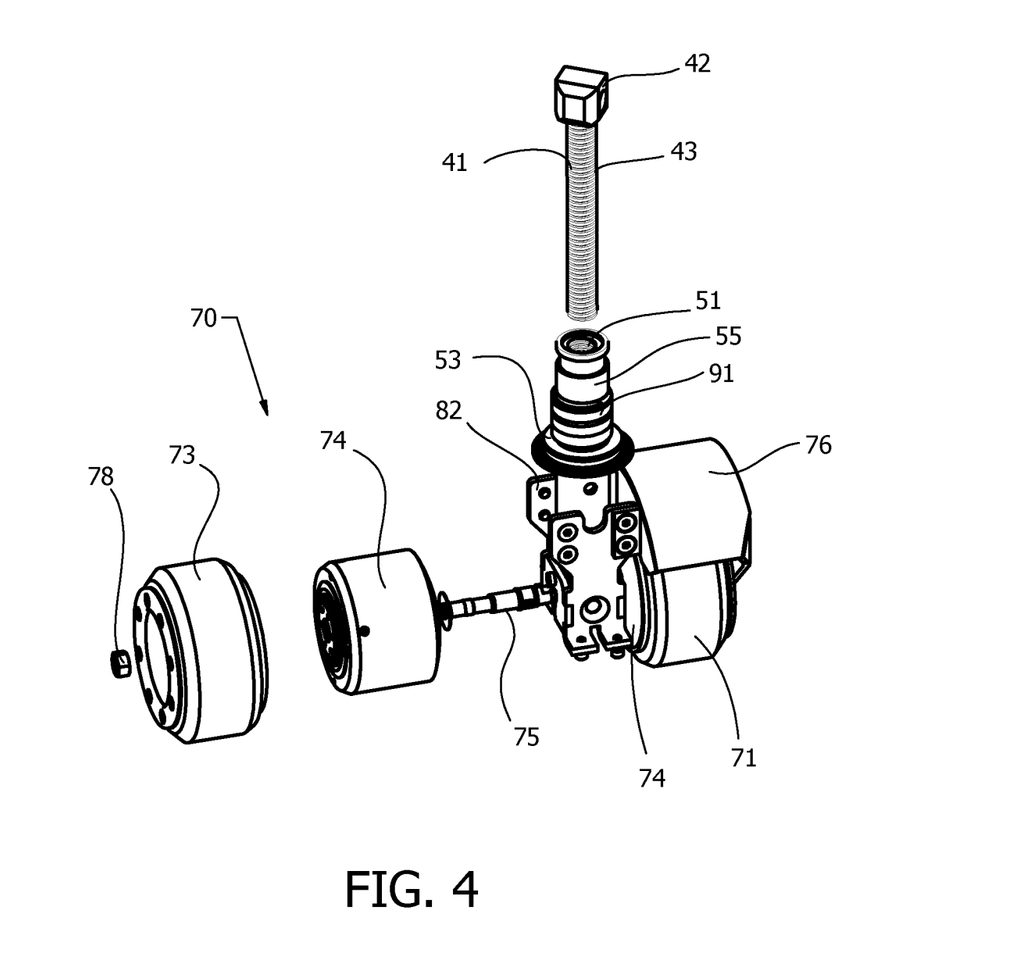
FIG. 4 is a front partially exploded perspective view of the drive assembly shown in FIG. 3. The fixed threaded shaft is shown unassembled to a rotating threaded shaft. In addition, a left wheel is shown unassembled.

At the lower end of rotating shaft 50 is a wheel plate 82 pivotably mounted by a wheel assembly fastener 77. Wheel plate is allowed to rotate with respect to rotating shaft 50. As best seen in FIGS. 3 and 4, attached to wheel plate 82 are left drive wheel 72 and right drive wheel 71. Both wheels 72 and 71 are spaced equally from rotating shaft 50. Drive wheels 71 and 72 are constructed similarly and referred to herein as a wheel assembly 70. As shown in FIG. 4 by exploding left wheel 72, a left axle 75 connects wheel 72 to wheel plate 82. A left motor 74 is inserted into a left tire 73 and both are removably attached to axle 75 by an axle nut 78. Mounted to plate 82 and above each wheel is a wheel fender 76.

Figure 5:
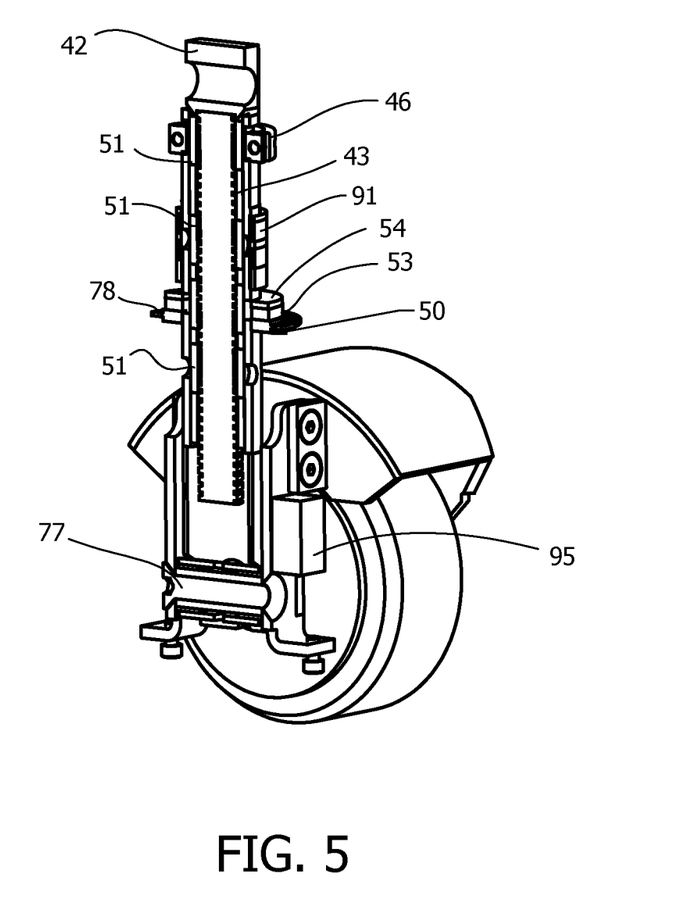
FIG. 5 is cross sectional perspective view of the pivot assembly of FIG. 3.
Figure 6:
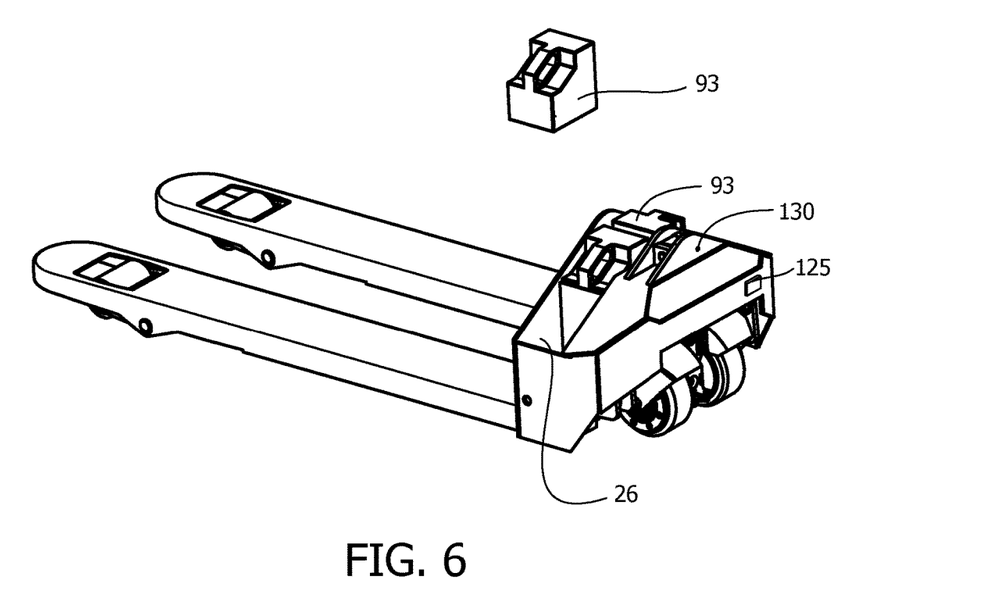
FIG. 6 is a front perspective view of the dual drive wheel pallet jack of FIG. 1, with a battery pack shown uninstalled.

Motor 74 is shown as a hub style motor common to electric vehicles. It has been found that motors in the range of 500 watts to 5000 watts can provide acceptable performance, but the present invention should not be construed to be limited to such a range or to a hub style motor. Similarly, left tire 73 is shown approximately six inches in diameter, having an internal opening of approximately three and a half inches in diameter and made from solid rubber. These sizes are known for providing good translation across uneven surfaces and providing high load capacity. It should be appreciated that different sized tires or construction can be utilized for a particular application all within the scope and spirit of the present invention. A controller 95, as seen in FIG. 5, provides electrical control to each motor 74. It should be appreciated, as described and shown in the Figures, that both right drive wheel 71 and left drive wheel 72 each contain a motor 74 and thus can be independently driven and controlled. Independent wheel motor 74 provide the means to control both the vertical position of structure 20 and also horizontal translation of pallet jack 10.

Figure 7:
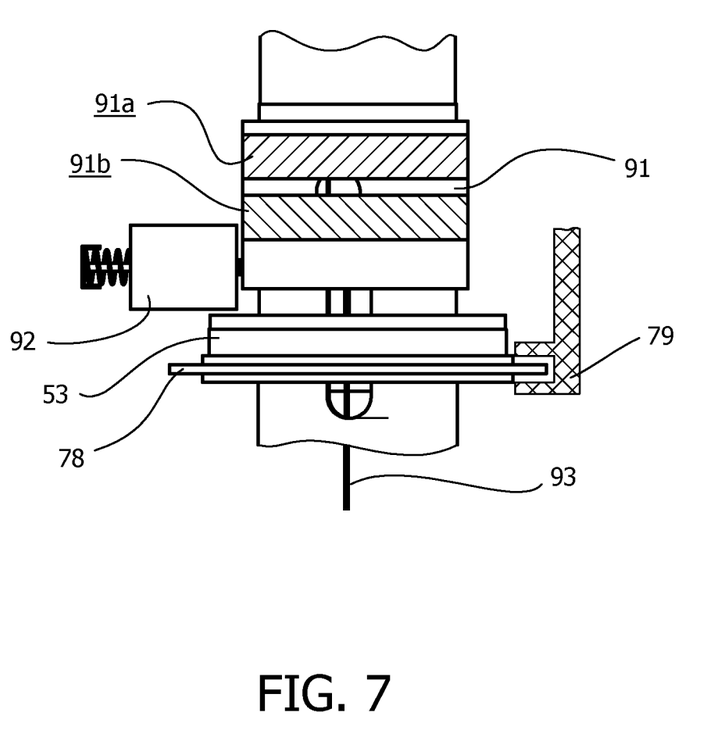
FIG. 7 is a front perspective view of a rotating electrical connector and electrical brushes.

Electrical power and independent control of motors 74 is done by supplying power to controller 95 via electrical connector 91 mounted to rotating shaft 50. As best shown in FIG. 7, electrical connector 91 has two or more vertically spaced bands 91a and 91b which are electrically connected to a cable harness 93 within shaft 50. As shown in FIG. 3, a plurality of brush assemblies 92 are radially mounted to pivot assembly 40 and aligned vertically to the one or more bands 91a and 91b. Brushes 92 are common in the art of electrical motors. A spring applies a force to an electrical contact that makes contact with bands 91a and 91b. Band 91a may be the positive side of a circuit and 91b the return path, or vice versa. Brushes 92 provide the means to allow rotating shaft 50 to rotate many times without disrupting electrical flow to controller 95 and motor 74. Electricity flows from batteries 93 to brushes 92 via common electrical cables (not shown). Brushes 92 transmit electricity to cable harness 93 via electrical connector 91. Cable harness 93 travels within rotating shaft 50 to controller 95 and motor 74. Cables connecting motor controller 95 and motors 74 are not shown but are extremely common and well understood in the field of electricity, motors and engineering.

While the construction of the electrical system according to the present invention is shown as a best mode, it should be appreciated that alternative methods can be employed with departing from the scope and spirit of the present invention. For instance, in addition to supplying power from batteries 93 to controller 95 by means of electrical connector 91, connector 91 may have many vertically spaced bands and corresponding brushes to transmit both power and data. Controller 95 may be placed within structure 20 and not to plate 82. In addition, a computer system 125 may be placed on or within structure 20 which communicates with controller 95 via electrical connector 91. Electrical controls are well known in the art of electrical design.

The novel structure described herein, provides unique and new ways to use a motorized, remote controlled, or automated pallet jack. Independent control and motors of left wheel 72 and right wheel 71 allow them to move at different speeds and in different directions as needed to support a particular pallet jack function. If both left wheel 72 and right wheel 71 move at the same speed and in the same direction, rotating shaft 50 remains stationary and the toque of motors 74 cause pallet jack 10 to move in a straight line either forward or backward. If left wheel 72 is controlled to move slightly faster than right wheel 71, rotating shaft 50 will rotate slightly causing pallet jack 10 to turn to the right while moving forward. Conversely, to turn left, left wheel 72 can be independently controlled to rotate slower than right wheel 72. When turning, there will also be a slight raising or lowering of the load as determined by the degree of rotation of drive assembly 60 and the pitch and direction of threads 43 and 51. Wheels 71 and 72 turning in the same direction at different speeds provides the means of steering pallet jack 10. If left wheel 72 and right wheel 71 move in opposite directions at the same speed, rotating shaft 50 will rotate relative to fixed shaft 41 but pallet jack 10 will not move forward or backward. In this scenario, motion of wheels 71 and 72 cause vertical separation change between rotating shaft 50 and fixed shaft 41 resulting in structure 20 raising or lowering. It should be appreciated that wheels 72 and 71 can spin without horizontal translation of jack 10 causing forks 21 and 22 to raise upward as a function of the pitch of threads 51 and 43. Electrical connector 91 and brushes 92 allow rotating shaft 50 to make as many turns as needed to utilize the full length of threads 43 and 51. Thus, rotation of drive assembly 60 provides the means translating a load, turning a load, and lifting a load, all without the space and cost of a separate lift actuator. While traveling or rotating, potentially uneven ground causes plate 82 to pivot keeping both wheels 71 and 72 in constant contact with the ground.

Control of pallet jack 10 according to the present invention is also novel. Direct current (DC) motors and motor controllers can provide feedback to computer system 125, such as current, RPM and voltage. Motor data in combination with system sensors can be used to provide optimized performance. For instance, when lifting a load it is desirable to have no translation of the pallet. The control system according to the present invention can adjust individual motor current and voltages to achieve matched motor RPMs of each motor regardless of uneven ground, wheel wear or differences in wheel friction. Matched motor RPMs ensures that drive assembly 60 purely spins and does not cause mixed translation and lift of jack 10 ("squirreling") when pure lift is desired. In addition, an optical encoder 79 mounted to structure 20, in combination with an optical disk 78 (best seen in FIG. 7) mounted to rotating shaft 50 can provide feedback to computer system 125 on the trajectory of drive assembly 60 in relationship to structure 20. When turning with a lifted load, encoder 79 provides data that can optimize the voltage or amperage to each wheel to maintain a desired trajectory. When traveling with a lifted load and as a result of the interaction of threads 43 and 51, one wheel will be required to produce more torque than the other. Although a common optical encoder is shown as a best mode of the present invention, it should be appreciated that any sensor capable of measuring rotation of rotating shaft 50 relative to structure 20 can provide the means optimizing the individual voltage and current to motors 74 of wheels 71 and 72 within the scope of the present invention.

Figure 8:
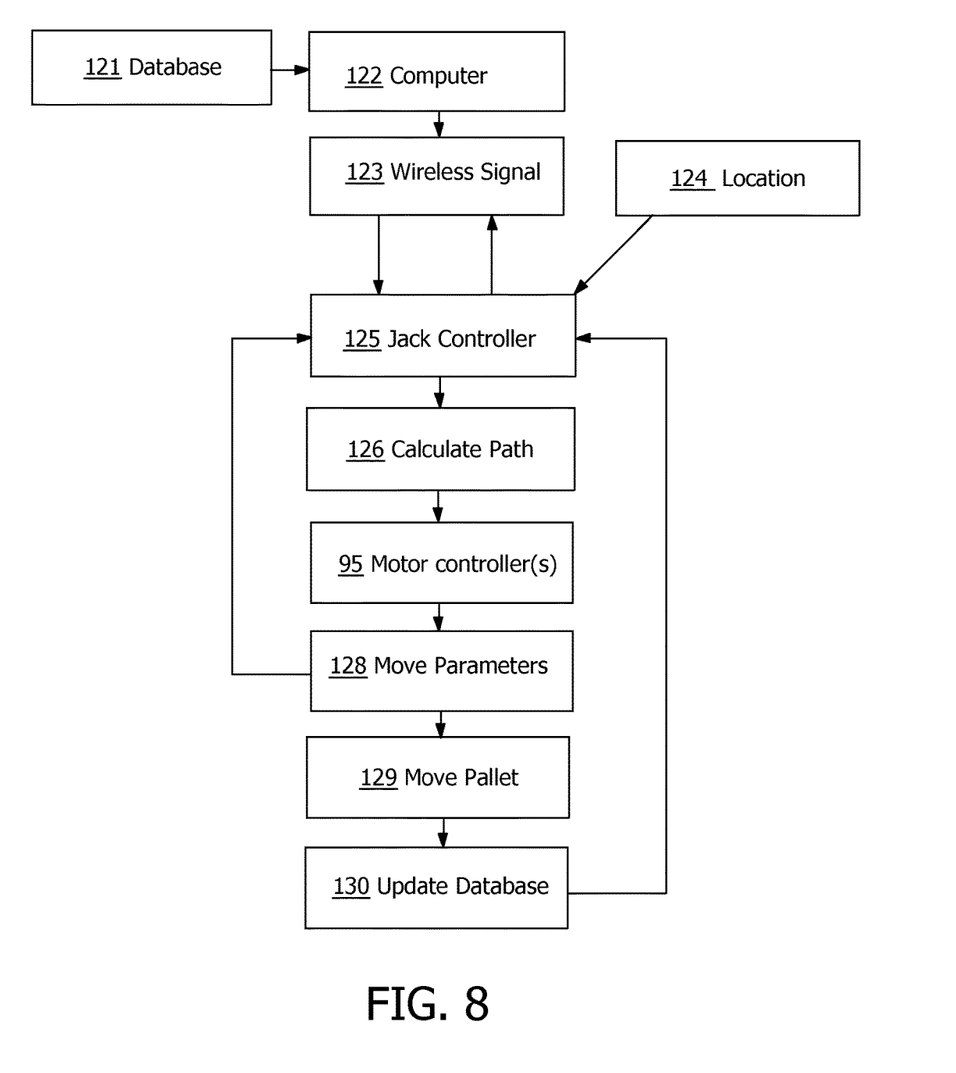
FIG. 8 is a block diagram showing a flow of communication of the pallet jack according to the present invention.

An example facility level robotic use scenario of novel pallet jack 10 is as follows. A wireless signal is sent to main jack controller 125 to activate pallet jack 10 and to move to a desired pallet location. Such a desired location and pathway information may come from a remote computer 122 and sent to jack 10 via a wireless signal 123 in potential formats such as but not limited to wifi and Bluetooth. Computer 122 may utilize transport, storage and pathway information from a database 121. Jack controller 125 may also receive data on its position from a location system 124. Location system 124 may be a common indoor or outdoor GPS system, it may be an external camera showing objections or locations, or it can be an internal camera reading visible trajectory lines and grids on the ground. Once activated, jack controller 125 may provide local path control and safety calculations. Once jack controller 125 determines its path, it sends signals to the one or more motor controller 95 resulting in independent movement of wheels 71 and 72 as needed to support the overall function of jack 10. As previously described above, wheels 71 and 72 are made to move in the same direction, and selectively at different speeds, turning and moving pallet jack 10 to the desired location of inserting forks 21 and 22 into a pallet. At the desired pallet, an optional GPS feedback module can confirm the desired location has been achieved. An optional RFID scanner 130 attached to structure 20 can read a bar code on the desired pallet to be moved. With many different styles of pallets and fork openings, wheels 71 and 72 are then rotated in opposite directions at the same speed to make structure assembly 20 and resulting forks 21 and 22 move to the optimal height for insertion into the target pallet. Wheels 71 and 72 are then made to rotate at the same speed and direction to cause forks 21 and 22 to enter the pallet to the optimal depth for that particular pallet. Wheels 71 and 72 are then made to rotate in opposite directions and at the same speed causing forks 21 and 22 to lift the pallet off the ground to the optimal height for the given load. Motor controller 95, jack controller 125, or in combination, can determine a plurality of move parameters 128, such as measuring the current draws of motors 74 required to lift the pallet and can use the motor currents to calculate the weight of the pallet. Knowing the weight of the pallet can not only confirm the correct pallet but can also be used to adjust system parameters for optimal speed and safety during movement of pallet jack 10 and the lifted load. Move parameters 128 may include maximum speed, maximum turning radius, maximum motor torque, maximum stopping speed, etc. Wheels 71 and 72 can then be moved in the same direction (forward or backward) and at potentially different speeds to move pallet jack 10 and the pallet to the drop location. At the drop location, wheels 71 and 72 can be made to rotate at the same speed and in opposite directions (also opposite to the lift direction for each) to lower forks 21 and 22 and the pallet to the ground surface. At any time in the process including after returning the load to the ground, data can be sent from jack controller 125 to computer 122 with location information, process information or for updating database 121.

It should be appreciated that alternative embodiments of the present invention are possible. For instance, rather than the automated robotic use scenario described above, the present invention can be applied for only motorized applications or remote controlled applications.

Figure 10:
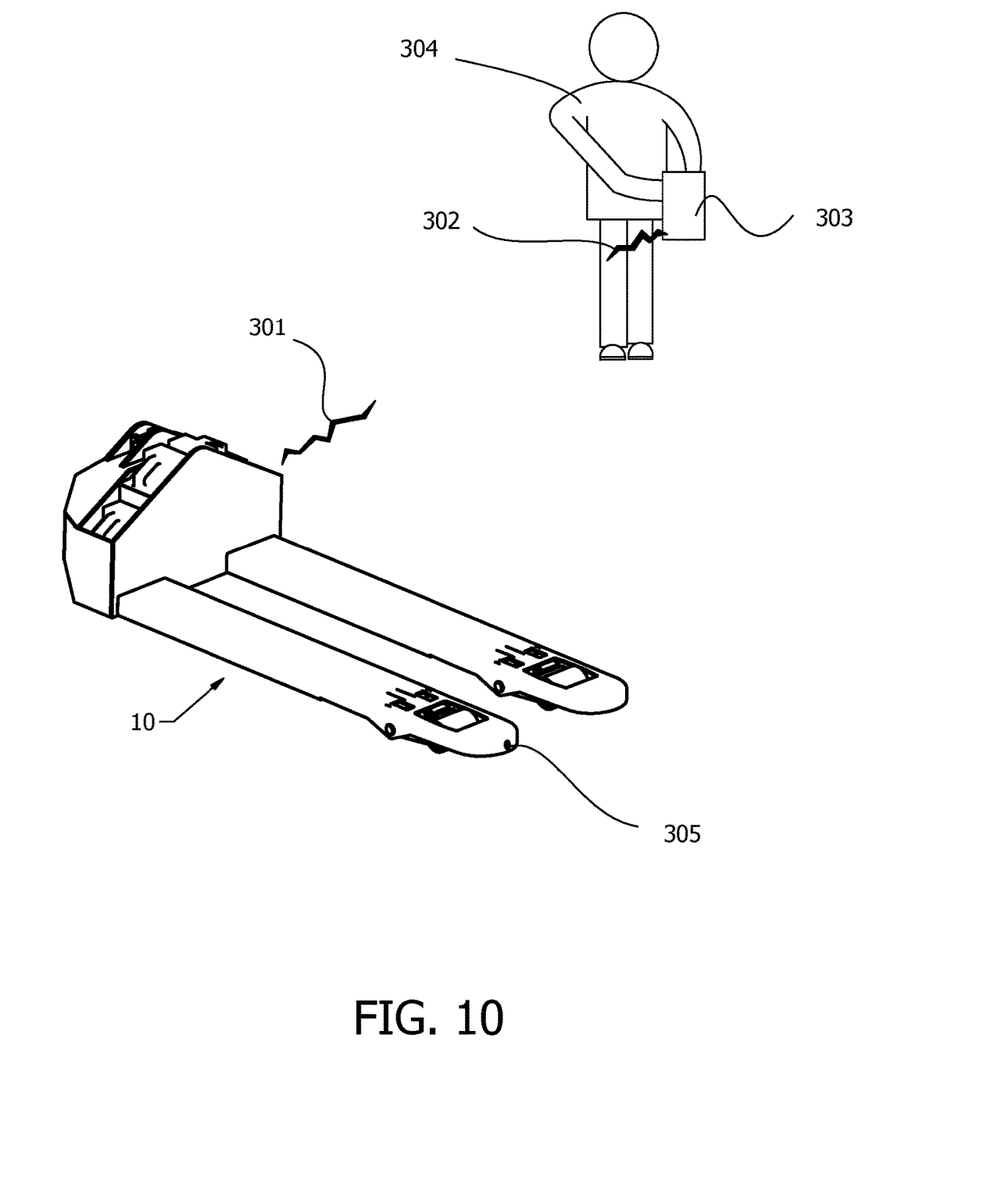
FIG. 10 is a perspective view of an alternative embodiment of the present invention showing a remote controlled version.

FIG. 10 shows a remote controlled embodiment according to the present invention. A user 304 using a remote device 303 interacts with jack 10 via a remote signal 302. Computer system 125 can process signal 302 and send a jack signal 301 back to remote device 303. In addition, jack 10 can provide user 304 real time data such as a video image from a camera 305 mounted to a front fork of structure 20. The remote controlled embodiment of FIG. 10 is ideal for situations where a user can be more safe and, or, more productive in a location away from jack 10. An example is a loading dock where user 304 can control one or more jacks 10. User 304 can provide a first loading instruction where a first jack 10 is to move to a desired location to pick up a pallet for a first transaction. Through the use of camera 305 and sensors providing data to computer system 125, the first jack 10 can work to carry out the first transaction. While first jack 10 is accomplishing its task, user 304 can provide a second instruction to a second jack 10. Safely and efficiently, user 304 can control one or more jacks 10 at various levels of remote control. At the most basic level of control, user 304 can provide all movement instructions for a single pallet jack 10 through remote device 303. It should be appreciated that although camera 305 is shown on a single fork, camera 305 could be mounted on any fork, the front or back side of structure 20, or there can be multiples of camera 305 for a given application.

Figure 9:
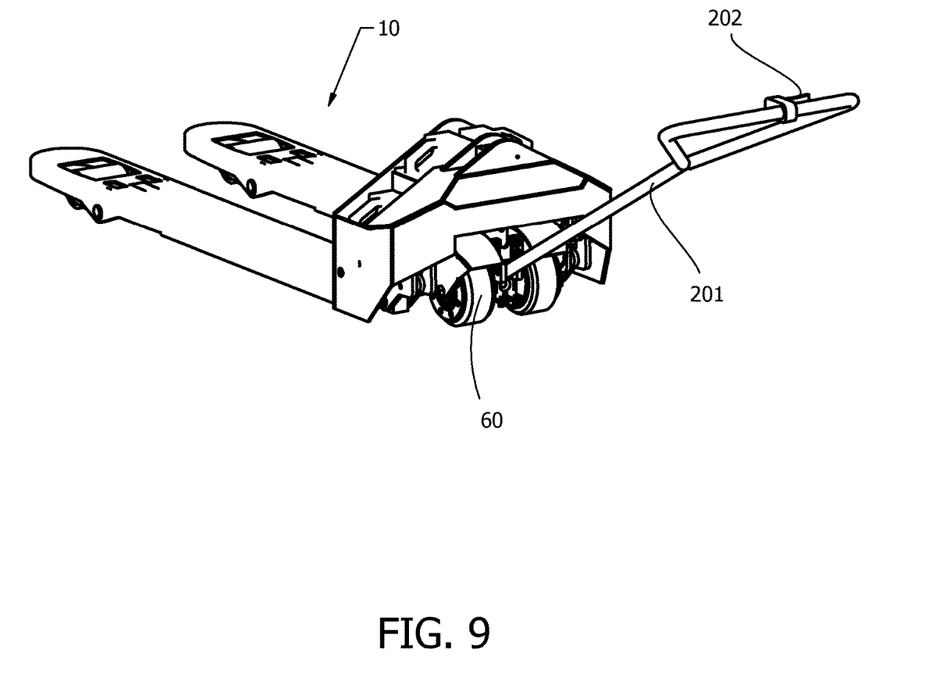
FIG. 9 is perspective view of an alternative embodiment of the present invention showing a motorized version with a steering handle.

FIG. 9 shows a motorized version of jack 10 also within the spirit and scope of the present invention. A rear tiller 201 is mounted to drive assembly 60 and also to a lift hydraulic cylinder (not shown), in a fashion common to manual jacks of the prior art. A user (not shown) can steer jack 10 via rear tiller 201 and also "pump" it up to lift the load. Rear tiller 201 has a control actuator 202 for providing instructions to computer system 125 and or motor controller 95. In this simplified embodiment which does not have a threaded connection, independently controlled drive wheels 71 and 72 provide the advantage of motorized translation of jack 10 and also steering assist, but wheels 71 and 72 do not lift the load. It has been found that with this embodiment the inside wheel of a turning radius can be programmed to maintain a certain RPM while the outside wheel is free to turn faster, thus providing the user significant control of tiller 201 and resulting jack 10. This embodiment of an independently controlled dual wheel motorized pallet has control advantages over motorized pallet jacks using a single drive wheel.

It should be appreciate that invention described herein provides automatic, robotic and motorized control of a pallet jack using common form factors of manual pallet jacks. The structure is more compact and lower cost than the prior art automated guide vehicles. The independent control of two drive wheels provides the ability to both move and raise/lower a pallet jack in a more low cost and reliable fashion than the prior art. Ultimately, the present invention can be used in any application of a manual pallet jack instead of requiring specialized pallets and facilities.

While the device and methods for driving and lifting loads via a motorized pallet jack described herein constitute preferred embodiments of the invention, it is to be understood that the invention is not limited to these precise form of assemblies, and that changes may be made therein without departing from the scope and spirit of the invention as defined in the appended claims.

The invention claimed is:

1. A motorized pallet jack comprising:
   a jack structure having at least one forward protruding fork having a forward mounted load support wheel connected to a lift linkage, said lift linkage also connected to a rear portion of said jack structure;
   a drive assembly having a stationary screw member defining an axis, said stationary screw member rotatably constrained to said jack structure, said stationary screw member in threaded connection to a rotatable screw member having a first drive wheel mounted offset to said axis and a second drive wheel mounted offset to said axis and opposite of said first drive wheel;
   a first motor connected to said first drive wheel and a second motor connected to said second drive wheel;
   wherein said first and second drive wheels can be driven at different speeds and in different directions causing controlled rotation of said rotatable screw member relative to said stationary screw member and vertical translation of said jack structure;
   further wherein said first and second drive wheels can be driven at the same speeds and in the same direction causing linear translation of said jack structure; and,
   further wherein said first and second drive wheels can be driven at different speeds in the same direction causing said jack structure to turn.

2. The motorized pallet jack as recited in claim 1, wherein said rotatable screw member includes a connector ring having two or more conduction strips in rotatable electrical contact with two or more electrical brushes mounted to said stationary screw member.

3. The motorized pallet jack as recited in claim 1, wherein said first and said second motor is a hub motor.

4. The motorized pallet jack as recited in claim 1, wherein said one or more forward protruding forks includes a camera.

5. The motorized pallet jack as recited in claim 1, wherein said rotating screw member includes a rotation measurement sensor.

6. The motorized pallet jack as recited in claim 1, wherein said rotatable screw member includes a pivot mounted bracket connected to said first and said second drive wheels.

7. A material moving device comprising:
   a rotating screw shaft having a shaft axis and a rotating thread section;
   a first drive wheel connected to a first side of said rotating screw shaft at a first distance from said shaft axis;
   a second drive wheel connected to a second side of said rotating screw shaft opposite of said first side at a second distance from said shaft axis equal to said first distance;
   said first and second drive wheels each having a motor electrically connected to a battery and to an electronic controller;
   a stationary screw shaft having a stationary screw thread section in connection to said rotating thread section of said rotating screw shaft;
   a jack structure connected to said stationary shaft and having at least one forward protruding fork; and,
   wherein said first and second drive wheels can be driven at different speeds and in different directions causing controlled rotation of said rotating screw shaft relative to said stationary screw shaft and vertical translation of said jack structure;
   further wherein said first and second drive wheels can be driven at the same speeds and in the same direction causing linear translation of said jack structure; and,
   further wherein said first and second drive wheels can be driven at different speeds in the same direction causing said jack structure to turn.

8. The motorized pallet jack as recited in claim 7, wherein said rotatable screw shaft includes a connector ring having two or more conduction strips in rotatable electrical contact with two or more electrical brushes mounted to said stationary screw shaft.

9. The motorized pallet jack as recited in claim 7, wherein said first and said second motors are hub motors.

10. The motorized pallet jack as recited in claim 7, wherein said one or more forward protruding forks includes a camera.

11. The motorized pallet jack as recited in claim 7, wherein said rotating screw shaft includes a rotation measurement sensor.

12. The motorized pallet jack as recited in claim 7, wherein said rotating screw shaft includes a pivot mounted bracket connected to said first and said second drive wheels.

* * * * *